United States Patent Office 3,829,378
Patented Aug. 13, 1974

3,829,378
PURIFICATION OF WASTE WATER FROM STYRENE BEAD POLYMER PRODUCTION
Hans-Georg Keppler, Weinheim, Ludwig Zuern, Bad Duerkheim, and Erhard Stahnecker, Ziegelhausen, Germany, assignors to Badische Anilin- & Soda-Fabrik Aktiengesellschaft, Ludwigshafen (Rhine), Germany
No Drawing. Filed Oct. 2, 1972, Ser. No. 294,461
Claims priority, application Germany, Oct. 7, 1971, P 21 50 056.1
Int. Cl. B01d 21/01
U.S. Cl. 210—42    1 Claim

ABSTRACT OF THE DISCLOSURE

Process for purifying waste water obtained in the production of styrene bead polymers in the presence of vinyl pyrrolidone polymers or vinyl alcohol polymers used as suspension stabilizers, which process comprises treating said waste water at 70–180° C. with 0.02 to 5% by weight of the persulfate of sodium, potassium or ammonium in order to flocculate the suspended matter.

---

This invention relates to a process for purifying waste water from styrene bead polymer production comprising heating the waste water with persulfates.

In the bead polymerization of monomers in aqueous phase there is often formed, in addition to the bead polymer, finely divided suspended matter consisting of high molecular weight compounds which remains in the aqueous phase after this has been separated, as they cannot be removed by filtration. Flocculating agents such as are used in order to precipitate suspended matter in municipal sewage systems are not effective in the present case. The removal of suspended matter from waste water from styrene bead polymerization may be carried out with the aid of swellable inorganic adsorbents such as bentonite or by flocculation with iron hydroxide. These processes are difficult to manipulate and are not capable of continuous operation. In addition, they are relatively costly.

The removal of such waste water has also been carried out by combustion, but this is a very uneconomical method due to the high capital outlay and high operating costs involved.

For these reasons it is an object of the invention to provide a process for purifying waste waters obtained in the polymerization of styrene, in an effective and inexpensive manner.

We have found a process for purifying waste water obtained from the production of styrene bead polymers in the presence of vinyl pyrrolidone polymers or vinyl alcohol polymers used as suspension stabilizers, wherein the suspended matter is flocculated by heating said waste water in the presence of from 0.02 to 5% by weight of the persulfate of sodium, potassium or ammonium.

By styrene polymers we mean polystyrene and copolymers of styrene containing at least 50% and preferably at least 75% by weight of polymerized styrene units. Suitable comonomers are ethylenically unsaturated copolymerizable compounds such as α-methylstyrene, nuclear-halogenated styrenes, nuclear-alkylated styrenes having from 1 to 4 carbons in the alkyl moieties, acrylonitrile, methacrylonitrile, esters of acrylic acid, methacrylic acid or fumaric acid with alcohols of from 1 to 10 carbon atoms, and also butadiene and N-vinyl compounds such as N-vinyl carbazole, N-vinyl pyridine or even small quantities (less than 0.5% by weight) of divinyl compounds such as butanediol acrylate and divinyl benzene.

The polymer beads may contain expanding agents which have been added before, during or after the suspension polymerization. Suitable expanding agents are normally gaseous or liquid hydrocarbons or halohydrocarbons which are non-solvents for the styrene polymer and have boiling points below the softening point of the polymer.

Processes for the manufacture of styrene bead polymers are well known and are described, for example, in Houben-Weyl, "Methoden der organischen Chemie," 4th Edition (1961), Vol. XIV/1, Georg Thieme Verlag, Stuttgart, pp. 839 et seq. This reference also describes the use of polyvinyl alcohol as protective colloid. Its manufacture by saponification of polyvinyl acetate is described, for example, in Ullmann, "Enzyklopaedie der technischen Chemie," Vol. 14 (1963), pp. 236 et seq. Polyvinyl alcohols containing ester groups are also suitable as protective colloids. German Patents 801,233 and 1,151,117 describe the use of homopolymers and copolymers of vinyl pyrrolidone as protective colloids in styrene bead polymerizations.

On completion of the bead polymerization of the monomer mixture containing a major amount of styrene, the polymer beads are separated from the milky aqueous phase, for example by filtration.

The milky aqueous phase which remains constitutes the waste water to be purified. To this there may be added up to 80% and preferably up to 40% of other waste waters from polymer production plants, for example rinse water from polymer dispersion factories.

It has been found, surprisingly, that the suspended matter may be precipitated by the method proposed by the present invention. The resulting flocculent precipitate may be separated from the waste water by usual means such as filters, strainer belt presses or decanters.

The sodium, potassium and ammonium salts of peroxodisulfuric acid are equally suitable as the persulfates. The addition of from 0.02 to 5% and preferably from 0.1 to 1% by weight of persulfate is conveniently effected continuously by metering in a relatively concentrated solution.

The waste water may be heated for example in heated stirred vessels. It is more economical, however, to operate continuously by using a heat exchanger in place of a stirred vessel, in which case it is particularly advantageous to preheat the waste water with the discharged product. Suitable heating media are steam and higher boiling hydrocarbons. The residence time required depends on the temperature achieved. At temperatures between 70° and 180° C. the suspended matter precipitates after from 5 minutes to 15 hours. We prefer to use temperatures of between 110° and 180° C., at residence times of from 5 minutes to 2 hours in the case of batchwise operation. When the process is operated continuously, shorter residence times may be used, for example from 0.5 to 5 minutes.

It is advantageous to carry out flocculation by the process of the invention in the presence of small amounts of adsorbents such as activated charcoal, silica or bentonite. In this case the waste water had added to it, in addition to alkali metal or ammonium persulfate, about 0.01 to 0.5% by weight of said adsorbents before, during or after heating.

The removal of the precipitate following flocculation is advantageously carried out continuously, for example on a suction belt strainer or in a decanter. The slurry thus obtained has a relatively high solids content of about 30% and can be destroyed at no great expense.

A particularly advantageous way of working up the precipitated matter is to allow the precipitate to settle in a settling vessel, which it does relatively quickly, and then to effect separation with separating equipment. As a result, only about one tenth of the original volume of waste water need be further treated for the removal of precipitate.

In Examples 1 to 9 below, the bead polymerization of styrene is carried out according to the following procedure.

The resulting aqueous phase containing suspended matter is separated from the polymer beads and serves as the basis for the clarifying tests.

Bead polymerization

A mixture of: Parts w./w.
Water _____ 100
Sodium pyrophosphate _____ 0.05
Sodium acetate _____ 0.05
Styrene _____ 100
Dibenzoyl peroxide _____ 0.3
t-Butyl perbenzoate _____ 0.25 is polymerized in a stirred pressure vessel with continuous stirring. Polymerization is initiated by heating to 80° C., at which temperature the mixture is held for 7 hours, after which it is heated to 90° C. After 5 hours at 90° C. the temperature is raised to 110° C. and held at that temperature for a further 4 hours, continuous stirring being maintained throughout. During the polymerization, 2.2 parts of a 10% aqueous solution of polyvinyl pyrrolidone as protective colloid (K value 90 as determined according to H. Fikentscher, "Cellulosechemic" 13 (1932), p. 58) are added after a total polymerization period of 2 hours at 80° C. The said addition is effected over 5 minutes. 7 parts of n-pentane are added over 15 minutes after a total polymerization period of 6 hours at 80° C.

On completion of polymerization the reaction mixture is cooled and the aqueous phase is separated for the clarifying tests.

If the protective colloid used in a copolymer of 95 parts of vinyl pyrrolidone and 5 parts of methyl acrylate in place of the polyvinyl pyrrolidone, the separated water may be clarified by the process of the invention in the same manner with equal success.

EXAMPLES 1 TO 9

The waste water coming from the bead polymerization of styrene is treated in a stirred vessel under the conditions of temperature and time given in the following Table using the additives stated therein. After cooling, the precipitated matter is filtered off and the filtrate is assessed for freedom from floculated matter.

TABLE

| Test No. | Peroxodisulfate of— | Amount (percent)* | Adsorbent (percent) | Temp. (° C.) | Time (hrs.) | Appearance after floc separation |
|---|---|---|---|---|---|---|
| 1 | Ammonium | 0.3 | | 110 | 1 | Clear pale color. |
| 2 | Sodium | 0.3 | | 110 | 1 | Do. |
| 3 | Potassium | 0.3 | | 110 | 1 | Do. |
| 4 | Ammonium | 0.3 | Activated charcoal (0.06). | 110 | 1 | Clear, colorless. |
| 5 | do | 0.6 | do | 90 | 8 | Do. |
| 6 | do | 1.0 | do | 70 | 15 | Do. |
| 7 | do | 0.3 | do | 130 | ½ | Do. |
| 8 | do | 0.3 | do | 150 | ¼ | Do. |
| 9 | do | 0.2 | Bentonite M (0.2) | 110 | 1 | Do. |

*Percent by weight based on weight of waste water.

EXAMPLE 10

The same batch as that used in Examples 1 to 9 is treated in the same manner except that the protective colloid used does not comprise 2.2 parts of a 10% solution of polyvinyl pyrrolidone but 3 parts of a 10% aqueous solution of polyvinyl alcohol, this being added to the reaction mixture over 5 minutes. The polyvinyl alcohol is highly saponified, i.e. it contains few ester groups, and it possesses a viscosity of 4 centipoises as measured on a 2% aqueous solution at 20° C. in a Hoepler viscometer. On completion of the polymerization and removal of the resulting polystyrene beads, the turbid waste water is heated in a stirred pressure vessel for 15 minutes at 150° C. after the addition of 0.4% by weight of sodium persulfate. The flocculent precipitate obtained is filtered off after cooling. The filtrate is water-clear and colorless.

We claim:
1. A process for purifying waste water obtained from the manufacture of styrene bead polymers by the aqueous suspension polymerization of styrene or a mixture of styrene and a ethylenically unsaturated comonomer, said mixture containing at least 50% styrene units, in the presence of vinyl pyrrolidone or vinyl alcohol polymers used as suspension stabilizers for the aqueous suspension polymerization, said polymerization resulting in a product comprising the bead polymers and a milky aqueous waste water phase, said phase containing finely divided suspended matter, said process comprising, separating the styrene polymer beads from the milky aqueous phase, precipitating said suspended matter from the milky aqueous phase by treating said phase at 70–180° C. with .02 to 5% by weight of persulfate of sodium, potassium, or ammonium, and separating the resulting precipitate.

References Cited
UNITED STATES PATENTS 2,979,491   4/1961   Piloni _____ 260—93.5 W
2,566,567   9/1951   Hutchinson et al. __ 260—93.5 W
2,663,701   12/1953  Ronáy et al. _____ 260—93.5 W CHARLES N. HART, Primary Examiner P. A. HRUSKOCI, Assistant Examiner